(No Model.) 3 Sheets—Sheet 1.

C. J. DORTICUS.
DEVICE FOR APPLYING COLORING LIQUIDS TO SIDES OF SOLES OR HEELS OF SHOES.

No. 535,820. Patented Mar. 19, 1895.

WITNESSES:
Wm. H. Caufield, Jr.
G. Basil Hooper.

INVENTOR:
CLATONIA JOAQUIN DORTICUS.
BY
Fred'k C. Fraentzel,
ATTORNEY

THE NORRIS PETERS CO., PHOTO-LITHO., WASHINGTON, D. C.

(No Model.) 3 Sheets—Sheet 2.
C. J. DORTICUS.
DEVICE FOR APPLYING COLORING LIQUIDS TO SIDES OF SOLES OR HEELS OF SHOES.

No. 535,820. Patented Mar. 19, 1895.

WITNESSES:
Wm. H. Canfield, Jr.
G. Basil Hooper.

INVENTOR:
CLATONIA JOAQUIN DORTICUS.
BY
Fred. C. Fraentzel,
ATTORNEY (No Model.) 3 Sheets—Sheet 3.

C. J. DORTICUS.
DEVICE FOR APPLYING COLORING LIQUIDS TO SIDES OF SOLES OR HEELS OF SHOES.

No. 535,820. Patented Mar. 19, 1895.

WITNESSES:
Wm. H. Caufield Jr.
G. Basil Hooper.

INVENTOR:
CLATONIA JOAQUIN DORTICUS.
BY
Fred C. Fraentzel,
ATTORNEY

United States Patent Office.

CLATONIA JOAQUIN DORTICUS, OF NEWTON, NEW JERSEY.

DEVICE FOR APPLYING COLORING LIQUIDS TO SIDES OF SOLES OR HEELS OF SHOES.

SPECIFICATION forming part of Letters Patent No. 535,820, dated March 19, 1895.

Application filed December 6, 1894. Serial No. 530,984. (No model.)

*To all whom it may concern:*

Be it known that I, CLATONIA JOAQUIN DORTICUS, a citizen of the United States, residing at Newton, in the county of Sussex and State of New Jersey, have invented certain new and useful Improvements in Devices for Applying Coloring Liquids to the Sides of the Soles or Heels of Shoes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel form of device for inking or coloring or marking the edges or sides of the soles or heels of shoes, boots, &c., to produce a bright finish of these parts of foot-wear; and the invention consists in the novel construction of a brush for the purpose stated, as will more fully appear hereinafter.

The invention further consists in the novel arrangements and combinations of parts, comprising the brush, such as will be fully described in the accompanying specification and finally embodied in the clauses of the claim.

The invention is illustrated in the accompanying sheets of drawings, in which—

Figure 1:
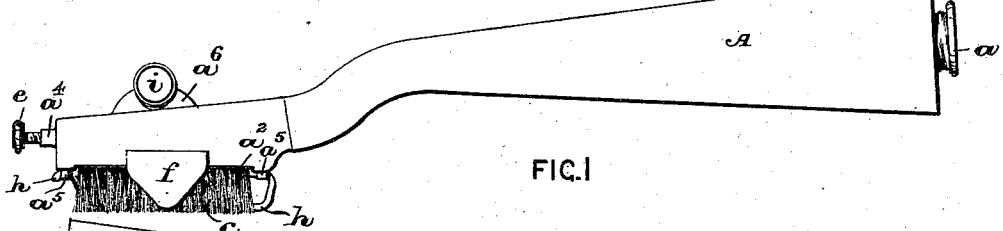
Figure 2:
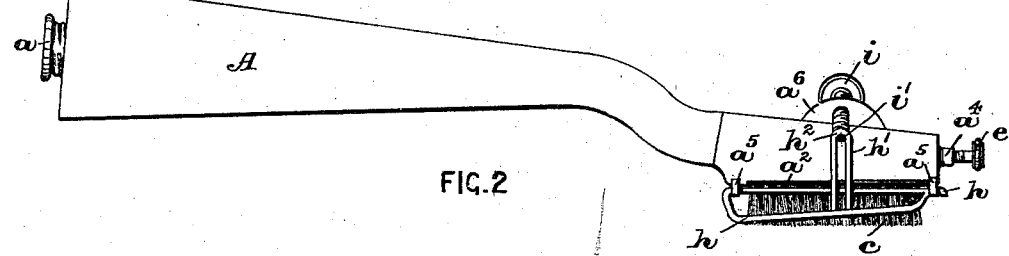
Figure 3:
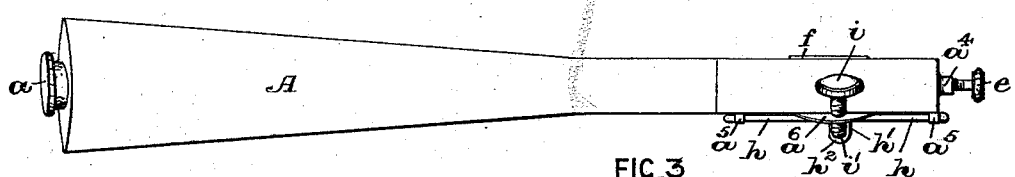
Figure 4:
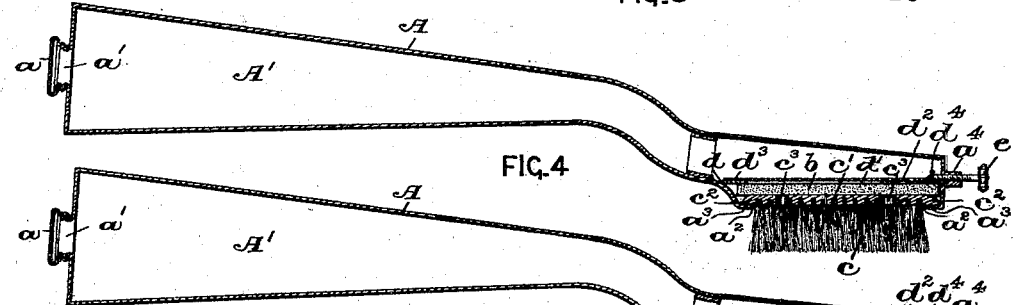
Figure 5:
Figure 6:
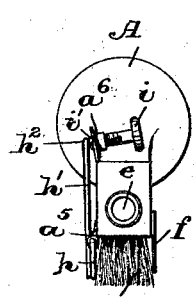
Figure 7:
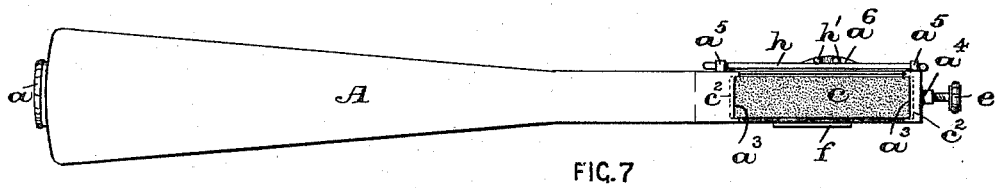
Figure 8:
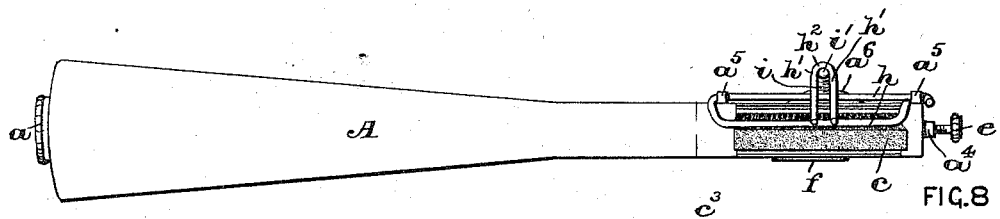
Figures 9, 10:
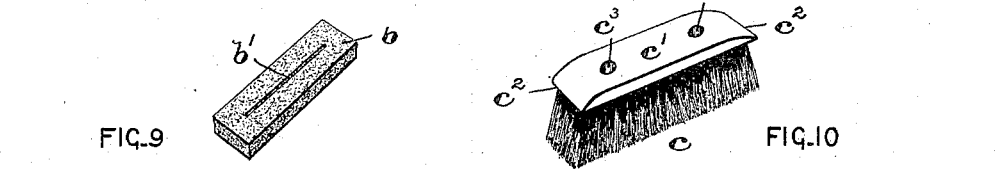
Figure 11:
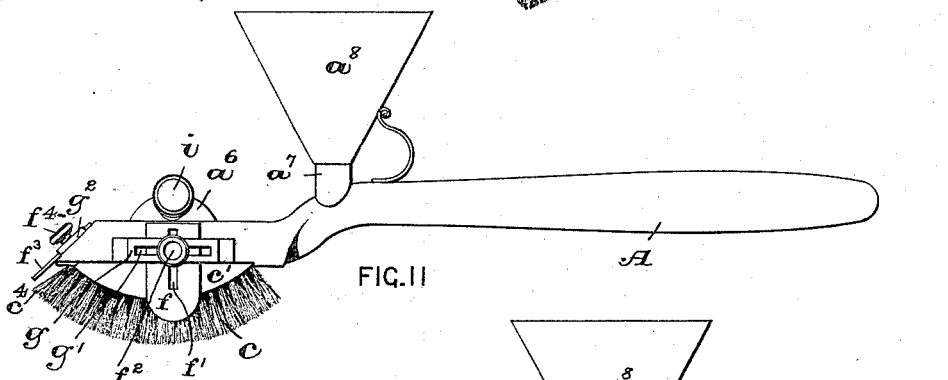
Figure 12:
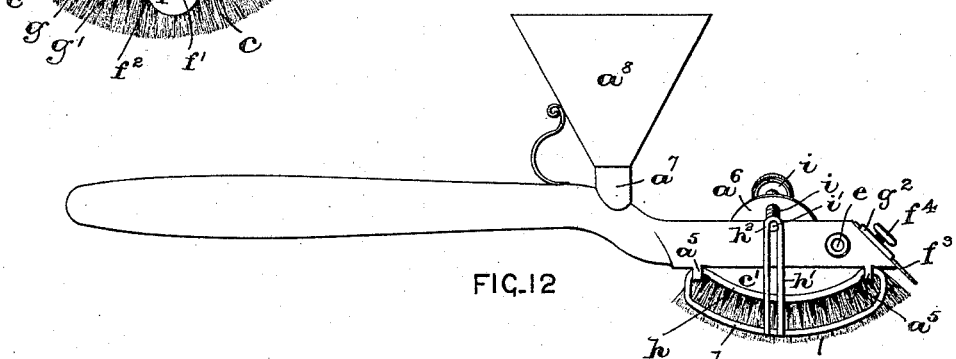
Figure 13:
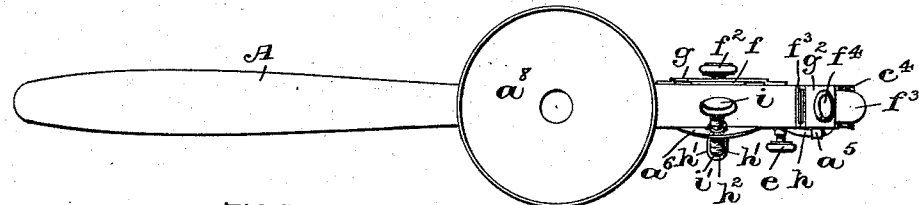
Figure 14:
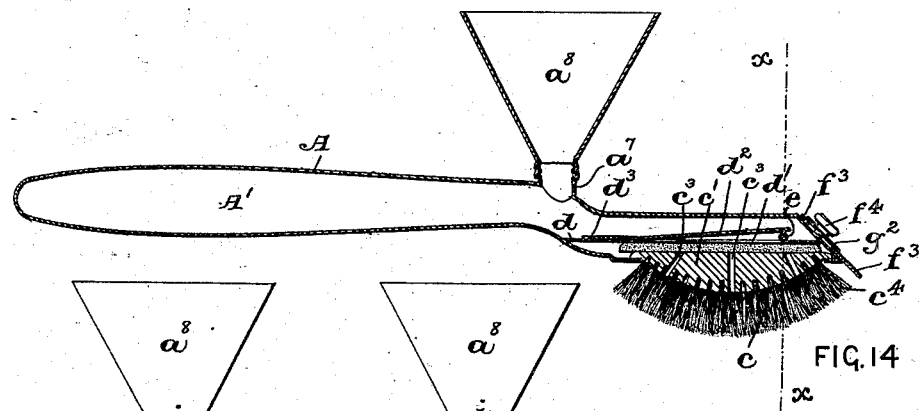
Figure 15:
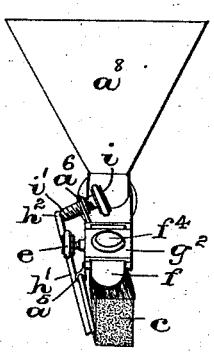
Figure 16:
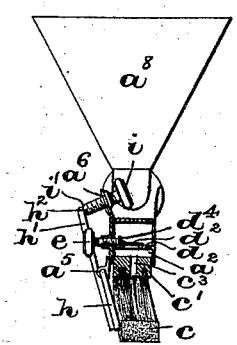
Figure 17:
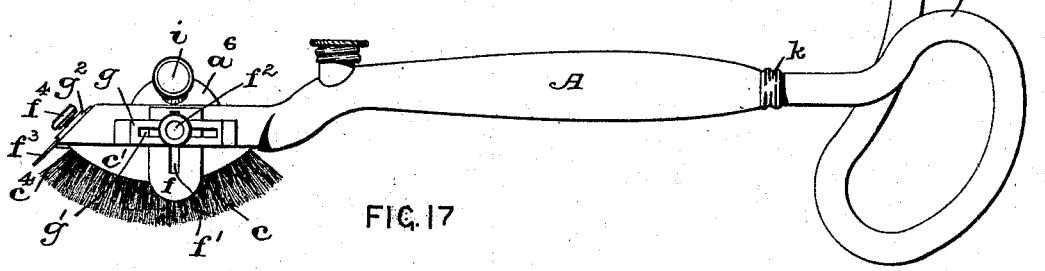

Figures 1 and 2 are the two side views of a brush embodying the principles of my invention. Fig. 3 is a top view of the same. Fig. 4 is a longitudinal vertical section of the brush, illustrating an arrangement of valve and a pad, and means connected with said valve, for regulating the flow of the ink or coloring fluid from the reservoir to the brush. Fig. 5 is a similar view, with the valve forced open to permit a free flow of the ink or coloring fluid to the bristles; and Fig. 6 is an end view of the device. Fig. 7 is a bottom view of the brush, and Fig. 8 is a like view, illustrating in connection therewith, means for compressing the bristles and thereby narrowing the width of the brush. Fig. 9 is a perspective view of a slitted pad employed in connection with the device, and Fig. 10 is a similar view of the brush-part, detached from the handle. Figs. 11 and 12 are the two side views of a brush, embodying certain details of a modified form of construction. Fig. 13 is a top view of the same. Fig. 14 is a longitudinal vertical section of the brush. Fig. 15 is an end view, and Fig. 16 is a cross-section of the brush, taken on line $x$ in Fig. 13. Fig. 17 is a side view of the brush, having connected therewith a flexible tubing and a reservoir containing the coloring fluid.

Similar letters of reference are employed in each of the above described views to indicate corresponding parts.

In said views, A indicates the handle of the device, which is preferably made from sheet metal and is made to form a reservoir $A'$ having at one end an opening $a'$ surrounded by a neck into which may be secured a removable plug or cap $a$, as will be seen from Figs. 1 to 8 inclusive.

The handle A may be of any suitable shape, but the lower or brush-end of the same is preferably square in cross-section and is open in the bottom, as at $a^2$. In this opening $a^2$ is arranged a suitable brush $c$, the ends $c^2$ of the backing $c'$ thereof, being arranged on the edges $a^3$ on opposite sides of the said opening, being held in such position by said edges $a^3$ and a soft pad $b$ between the upper surface of the back $c'$ of the brush and a plate $d$ firmly secured in the forward end of the brush handle, as clearly shown in Figs. 4, 5 and 14.

The brush back $c'$ is provided with perforations or holes $c^3$, the pad $b$ being preferably slitted, as at $b'$, see Fig. 9, and the plate $d$ is provided with a suitable opening $d'$ over which is arranged a spring plate $d^2$, secured to the plate $d$ at $d^3$, and, owing to its spring action, normally closes the opening $d'$ in said plate $d$. This construction thereby forms a valve, which prevents the flow of the liquid in the reservoir $A'$ onto the pad $b$ and thence into the brush $c$, when the device is not in use.

As soon as it is desired to use the brush for coloring or marking the edges or sides of the soles or heels of shoes, the operator turns an adjusting screw $e$, adapted to turn in a screw-threaded boss $a^4$ in the end of the handle, thereby bringing the forward end of said screw $e$ against a lip or projection $d^4$ on said plate $d$, which raises said plate from its closed position, shown in Fig. 4, to its open position, illustrated in Fig. 5. Thus it will be clearly evident that by the adjustment of said screw $e$, the plate or cover $d^2$ can be sufficiently raised and lowered to supply a greater or smaller amount of the liquid in the reservoir A' upon the pad $b$, and hence into the brush bristles, or the valve can be entirely closed, if desired.

As has been previously stated, the pad $b$ is provided with a slit or opening $b'$, which conducts the fluid to the perforations or holes in the back of the brush. The pad fits on the surrounding edges $a^3$ of the opening $a^2$ in the handle of the device thereby preventing the fluid from leaking on the sides of said opening and the ink or fluid can flow only through the openings in the back of the brush and thence through the bristles of the same.

Instead of arranging the adjusting screw $e$ in the end of the brush holder or handle A, the same may be arranged in the side of the same, as illustrated in Figs. 13 to 16 inclusive, and the screw $e$ can be turned to raise the spring plate $d^2$ in a like manner, as will be clearly understood from an inspection of said figures.

In order to prevent the coloring liquid on the brush from getting upon the soft leather portion of the shoe, above the sole or heel, I have arranged on the side of the holder A, a certain guide plate $f$ which is rounded on its lower end and which slides in the joint formed by the sole or heel of the shoe and the vamp secured thereto. Thus it will be evident, that the operator can move the brush-portion $c$ quickly along the edge of the sole or heel of the shoe, without any possible chance of getting the coloring liquid on the upper shoe leather and staining the same. Said guide or guard plate $f$ may be permanently secured to the side of the brush holder, in any convenient manner, being preferably soldered fast thereto, as illustrated in Fig. 1, or it may be adjustably arranged in a frame $g$, provided with a slot $g'$, secured to the side of the brush holder, as shown in Figs. 11, 13 and 17. In this case, said guide or guard plate is provided with a slot $f'$ and a suitable set screw $f^2$, whereby the said plate can be adjusted vertically or sidewise, as may be necessary.

When the brush is intended for use in blackening or coloring the heel of a shoe, the brush is rubbed or passed sidewise along the surface of the heel and to prevent the end $c^4$ from spreading the liquid on the surface of the upper leather of the shoe, I have secured to the end of the brush holder a guide or guard-plate $f^3$, which can be permanently fixed in position on the end of said holder, or may be provided with a set-screw $f^4$ for adjustably holding said guide or guard-plate $f^3$ in a frame $g^2$ on the end of the brush holder, as will be clearly understood from Figs. 11, 12, 13, 14, 15 and 17.

In order to successfully regulate the width of the brush $c$ and to vary the same, according to the thickness of the sole of the shoe, the one side of the brush-holder may be provided with means adapted to be forced against the side of the bristles of the brush and thereby compress the same. In this manner, the width of the brush $c$ can be made to correspond with the thickness of the sole of the shoe, thereby avoiding any possibility of staining the marginal edge on the bottom of the sole, while the guide or guard-plate $f$ protects the vamp or upper leather of the shoe. Said compression device consists essentially, of a suitable frame $h$, preferably made of wire, which is pivotally arranged in perforated ears or lugs $a^5$ on the side of the brush-holder A, and is provided with an upwardly projecting arm $h'$. In a bearing $a^6$ on the upper surface of the holder A is arranged a screw $i$, the free end $i'$ of which is in operative engagement with the end $h^2$ of said arm $h'$. When said screw $i$ is screwed up so as to force its end $i'$ against the arm $h'$, then the wire frame $h$ will be forced forward in the direction of arrow $y$, see Fig. 16, which will naturally compress the bristles of the brush and thereby lessen the width of the latter.

When the screw $i$ is unscrewed or turned in the opposite direction, the pressure is taken from the frame $h$, and the tendency of the bristles will be to spread, whereby the brush assumes its normal width, as will be clearly evident. Thus it will be seen, that the operator can vary the width of the brush $c$, at will, to suit any width of the sole of the shoe.

In the construction illustrated in Figs. 1 to 8 inclusive, the brush handle is made to serve as a reservoir for the ink or coloring liquid, but the said handle or holder may be provided with a suitable neck $a^7$ on which is arranged a receptacle $a^8$ of any desired shape, in which the liquid can be stored for use, as required.

In Fig. 17, I have illustrated the end of the handle A provided with a cap or plug $k$ fitted thereon, with which I can connect a flexible piece of tubing $k'$, which communicates with a reservoir or receiver $k^2$ secured to the operator's work-bench or to the wall. The flexible tubing permits of the brush being conveniently moved along the edge of the sole or sides of the heel of the shoe.

It will be seen from the foregoing description, that when the valve in the forward end of the handle has been opened, the flow of the ink or liquid through the valve can be regulated by the set-screw employed, thereby sufficiently moistening the pad $b$ and conducting the proper quantity of liquid through the slit or opening $b'$ in said pad to and through the holes or perforations in the back of the brush and down between the bristles thereof.

As will be seen, more especially, from Figs. 4 and 5 of the drawings, the brush-handle or holder A may be made in two separable parts, to allow the operator to disconnect said parts to clean out the reservoir A' and its connecting parts, in case of the precipitation of the ink or liquid therein, causing it to clog and preventing the free flow of the liquid into the brush c.

By the use of the herein-above described device, a perfect brush, for the purposes stated, is the result, and one, which prevents all possibility of the staining of the upper shoe leather or the bottom of the sole, by accident or by the carelessness of the operator, during the operations of applying the ink or coloring liquid to the edge of the sole or the heel of the shoe.

A further advantage is that the operator can apply the liquid to the shoe in less time and much better than could be done heretofore by the old method of any ordinary brush or sponge. Hence, the cost of production of the shoe is materially lessened and a better article is produced than has heretofore been practicable.

Having thus described my invention, what I claim is—

1. A device for supplying ink or a coloring liquid to the sides of the sole or heel of a shoe, consisting essentially, of a hollow handle A forming a reservoir A', having its lower end rectangularly formed and provided with an opening $a^2$ and the surrounding edges $a^3$, a brush removably arranged on said edges $a^3$, having a solid back c' and perforations therein, a slitted pad arranged over said back of the brush, and means for securing said pad in place, substantially as and for the purposes set forth.

2. A device for supplying ink or a coloring liquid to the sides of the sole or heel of a shoe, consisting essentially, of a hollow handle A forming a reservoir A', having its lower end rectangularly formed and provided with an opening $a^2$ and the surrounding edges $a^3$, a brush removably arranged on said edges $a^3$, having a solid back c' and perforations therein, a slitted pad arranged over said back of the brush and means for securing said pad in place, consisting of a metallic plate d having an opening d', and a spring-plate secured on said plate over said opening, adapted to be raised or lowered, to open or close said opening d', substantially as and for the purposes set forth.

3. In a device for applying ink or a coloring liquid to the sides of the sole or heel of a shoe, the combination, with the handle and the brush connected therewith, of a compression device adapted to act by pressure against the side of the brush, consisting essentially, of a wire frame h pivoted to the side of the brush-handle, and provided with an arm h', and a screw rotating in a bearing on the brush-handle, being adapted to bear against the said arm h', substantially as and for the purposes set forth.

4. In a device for applying ink or a coloring liquid to the sides of the sole or heel of a shoe, consisting essentially, of a hollow handle forming a reservoir, an opening, as $a^2$, in the forward end of said handle, a brush arranged in said opening, having a perforated back, a valve over said brush, and means for opening and closing the same, a pad, as b, between said valve and the back of the brush, and a compression device on said handle, adapted to act by pressure against the side of the brush, consisting essentially, of a wire frame h pivoted to the side of the brush-handle, and provided with an arm h', and a screw rotating in a bearing on the brush handle, being adapted to bear against said arm h', substantially as and for the purposes set forth.

In testimony that I claim the invention set forth above I have hereunto set my hand this 3d day of December, 1894.

CLATONIA JOAQUIN DORTICUS.

Witnesses:
   J. C. HOWELL,
   GEORGE A. SMITH.